United States Patent [19]

Nakatani

[11] Patent Number: 4,827,407
[45] Date of Patent: May 2, 1989

[54] VECTOR PROCESSING SYSTEM

[75] Inventor: Shoji Nakatani, Kawasaki, Japan

[73] Assignee: Fujitsu Limited, Kawasaki, Japan

[21] Appl. No.: 932,324

[22] Filed: Nov. 19, 1986

[30] Foreign Application Priority Data

Nov. 20, 1985 [JP] Japan .................. 60-260858

[51] Int. Cl.$^4$ .................. G06F 13/00; G06F 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,573,851 | 4/1971 | Watson et al. | 364/200 |
| 4,051,551 | 9/1977 | Lawrie et al. | 364/200 |
| 4,153,932 | 5/1979 | Dennis et al. | 364/200 |
| 4,293,941 | 10/1981 | Muraoka et al. | 364/200 |
| 4,298,936 | 11/1981 | Shapiro | 364/200 |
| 4,370,732 | 1/1983 | Kogge | 364/900 |
| 4,435,765 | 3/1984 | Uchida et al. | 364/200 |
| 4,589,067 | 5/1986 | Porter et al. | 364/200 |
| 4,594,682 | 6/1986 | Drimak | 364/200 |
| 4,633,434 | 12/1986 | Scheuneman | 364/900 |
| 4,651,274 | 3/1987 | Omoda et al. | 364/200 |
| 4,665,479 | 5/1987 | Oinaga | 364/200 |
| 4,680,730 | 7/1987 | Omoda et al. | 364/200 |
| 4,697,235 | 9/1987 | Motegi | 364/200 |
| 4,706,191 | 11/1987 | Hamstra et al. | 364/200 |
| 4,731,724 | 3/1988 | Michel et al. | 364/200 |
| 4,757,440 | 7/1988 | Scheuneman | 364/200 |
| 4,760,545 | 7/1988 | Inagami et al. | 364/200 |

*Primary Examiner*—Gareth D. Shaw
*Assistant Examiner*—Joseph T. Fitzgerald
*Attorney, Agent, or Firm*—Staas & Halsey

[57] ABSTRACT

A vector processing system is provided, including a store data alignment circuit for a pipe line structure and improving an access time for storing vector-processed data in main storage units connected thereto. The vector processing system includes: a unit for storing vector-processed data; a unit for controlling the reading of the vector-processed data from the vector-processed data storing unit, and the storing of the read data in the main storage units; a unit correspondingly provided to the main storage unit, for receiving the vector-processed data through the read and store control unit and buffering the data therein; a unit for managing the data stored in the data buffering unit; and a unit for determining a priority of a store access to the main storage unit. The read and store control unit and the main storage unit are operable in response to the priority determined by the priority determining unit. The main storage unit is activated to store the vector-processed data when the vector-processed data are stored in the data buffering unit, or when the store of the vector-processed data from the vector-processed data storing unit to the data buffering unit is started, after the priority determination is completed.

11 Claims, 10 Drawing Sheets

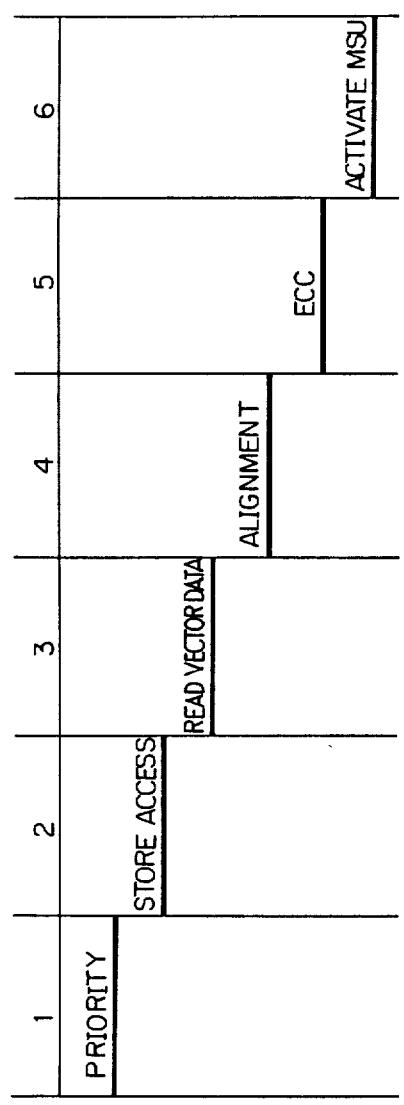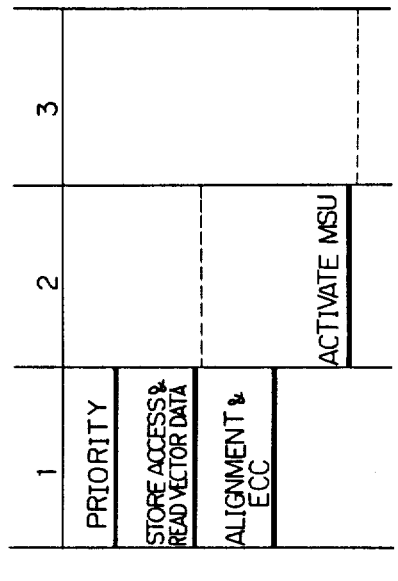

VECTOR PROCESSING SYSTEM

BACKGROUND OF THE INVENTION

The present invention relates to a vector processing system. More particularly, it relates to a vector processing system in which the speed of the store access operation is improved.

The vector processing systems described below are widely known. The vector processing system is connected to a memory storage unit(s) for storing data to be vector-calculated. The data in a main storage unit are loaded, aligned for vector calculation in a certain order, stored in a vector register unit, and vector-calculated. The vector-calculated data are re-aligned, for storing in the main storage unit and then stored in the main storage unit. The vector calculation may be an addition, multiplication, division or any combination thereof. To speed up the above operation, the vector processing system is given a pipe line construction. In addition, when the vector processing system is connected to a plurality of main storage units, a priority decision circuit for determining the priority for access to the main storage units is provided.

The prior vector processing systems suffer from the disadvantages of a low operation speed and a complex circuit construction.

SUMMARY OF THE INVENTION

An object of the present invention is to provide a vector processing system with an improved operation time.

According to the present invention, there is provided a vector processing system operatively connected to at least one main storage unit for storing source data to be vector-processed and vector-processed data, including: a unit for storing vector-processed data; a unit, operatively connected to the vector-processed data storing unit, for controlling the reading of the vector-processed data from the vector-processed data storing unit and then storing the read data to the main storage unit; a unit, operatively connected to the read control unit and the main storage unit, and correspondingly provided to the main storage unit, for receiving the vector-processed data through the read and store control unit and buffering the data therein; a unit, operatively connected to the read and store control unit and the data buffering unit, for managing the data stored in the data buffering unit; and a unit, operatively connected to the read and store control unit, the data managing unit, and the main storage unit, for determining a priority of a store access to the main storage unit.

The read and store control unit and the main storage unit are operable in response to the priority determined at the priority determining unit. The main storage unit is activated to store the vector-processed data in the data buffering unit, when the vector-processed data are to be stored in the data buffering unit, or when a storing of the vector-processed data from the vector-processed data storing unit to the data buffering unit, through the read and store control unit, is started, after the priority determination is completed.

The read and store control unit may include an alignment circuit for aligning the vector-processed data read from the vector-processed data storing unit in a predetermined order defined by a store order in the main storage unit, and storing the aligned data in the data buffering unit.

The main storage unit may include a plurality of independently operable main storages and the data buffering unit may include a plurality of data buffering circuits, each operatively connected to a corresponding main storage. The alignment at the read and store control unit is effected to meet the store order in the main storages.

The read and store control unit may have a pipe line structure for performing the control in parallel.

The vector-processed data storing unit includes a memory circuit for storing the vector-processed data. The vector-processed data storing unit may further include an additional memory circuit for storing data to be vector-processed.

The vector-processed data storing unit may include a vector calculation circuit for vector-calculating the data in the an additional memory circuit in the vector-processed data storing unit and storing the calculated data in the memory circuit in the vector-processed data storing unit.

The vector processing system may further include a unit, operatively connected between the main storage unit and the vector-processed data storing unit, for storing the source data to be vector-calculated in the main storage unit in the additional memory circuit in the vector-processed data storing unit. The source data loading unit may include an additional alignment circuit for aligning the source data read from the main storage unit in a predetermined order defined by a vector calculation order in the vector-processed data storing unit.

BRIEF DESCRIPTION OF THE DRAWINGS

Other objects and features of the present invention will be described in detail with reference to the accompanying drawings, in which;

FIGS. 4a to 4f are timing charts for explaining the operations of the circuits in FIGS. 1A, 1B, 2 and 3;

FIGS. 9a to 9d are timing charts for explaining the operations of the circuits in FIGS. 5A, 5B, 6, 7 and 8.

DETAILED DESCRIPTION OF THE PREFERRED EMBODIMENTS

Before describing the preferred embodiments, a vector processing system will be generally described below in detail with reference to FIGS. 1A, 1B, 2, 3 and 4.

Figure 1A:
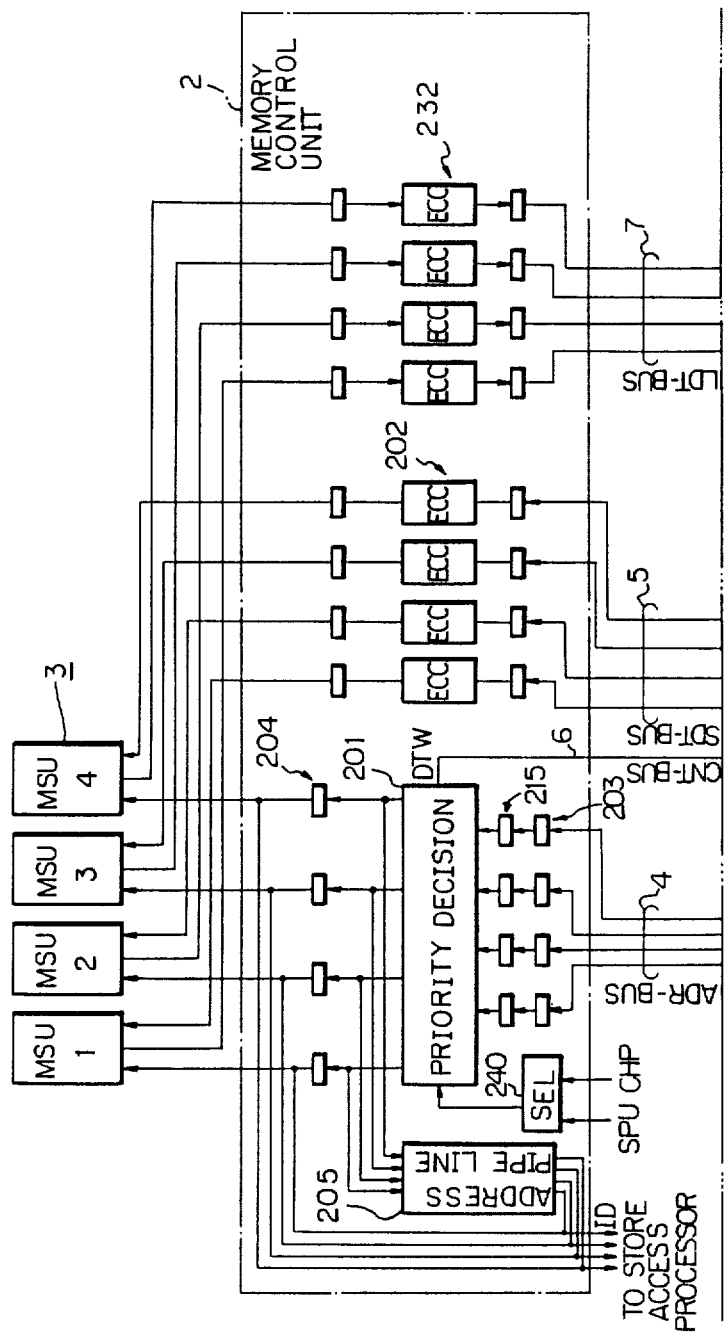
FIG. 1, consisting of FIGS. 1A and 1B are block diagrams showing the configuration of a vector processing system according to an embodiment of the present invention.
Figure 1B:
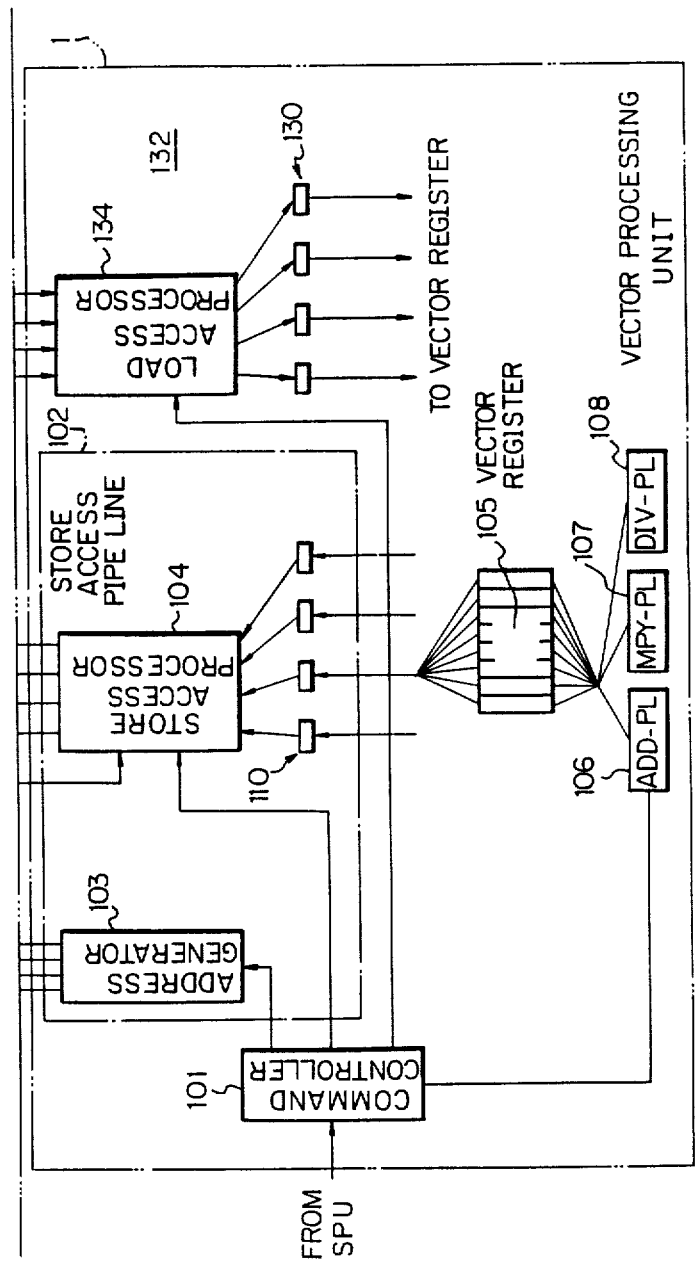
Figure 2:
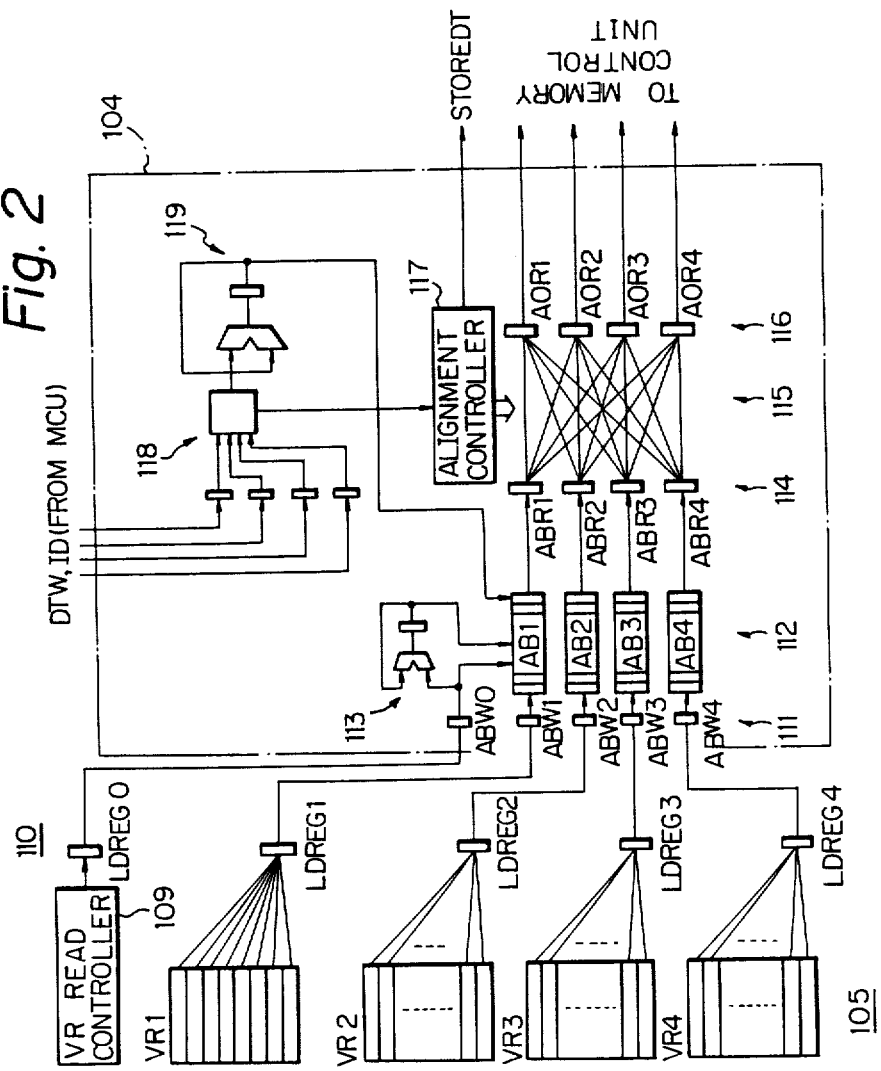
FIG. 2 is a circuit diagram of a store access processor in FIG. 1B.
Figure 3:
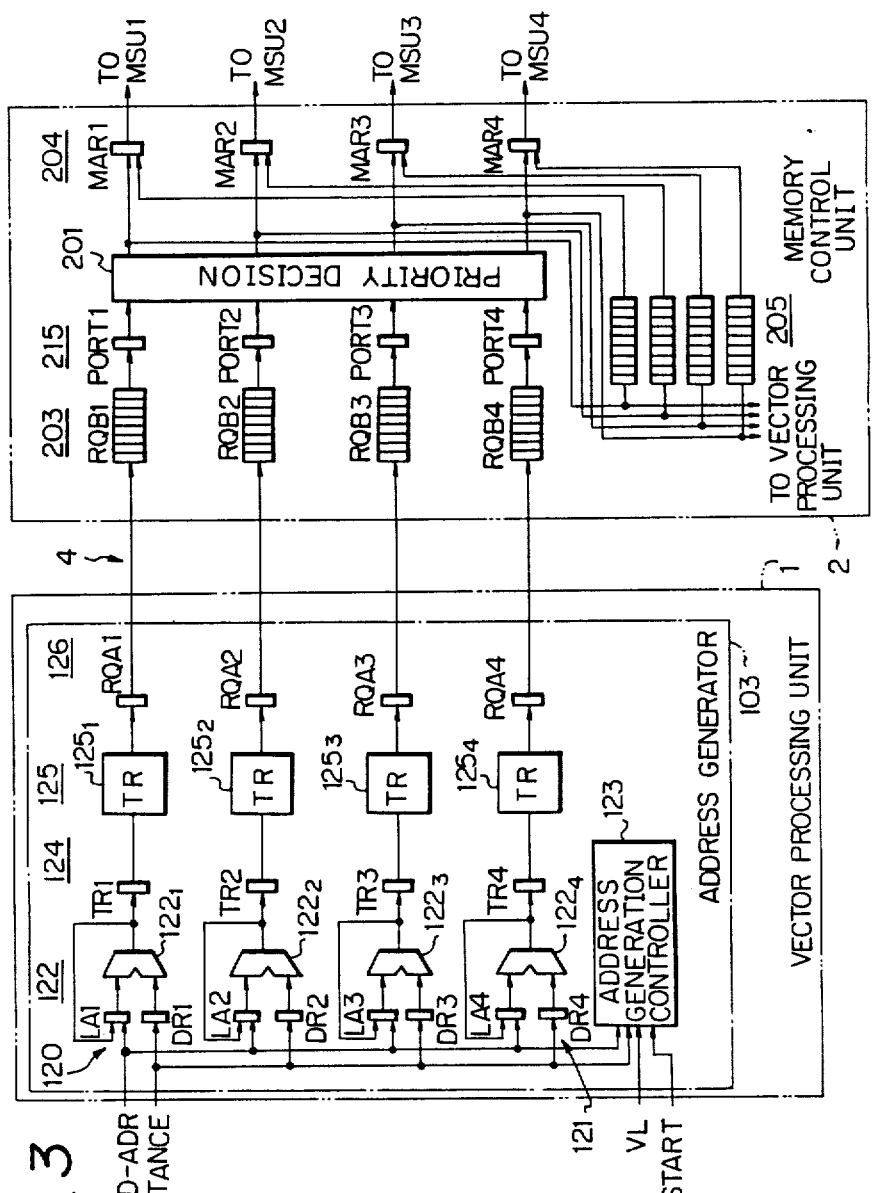
FIG. 3 is a circuit diagram of an address generator and a priority decision circuit as shown in FIGS. 1A and 1B.

FIGS. 1A and 1B show a vector processing system, FIG. 2 shows a store access pipe line therein, and FIG. 3 shows an address generator and a priority decision circuit therein.

Referring to FIGS. 1A and 1B, reference numeral 1 denotes a vector processing unit (VPU); 2, a memory control unit (MCU); 3, a main storage unit (MSU) group; 4, an address bus (ADR-BUS); 5, a store data bus (SDT-BUS); 6, a control signal bus (CNT-BUS); 7, a load data bus (LDT-BUS); 101, a command controller; 102, a store access pipe line; 103, an address generator; 104, a store access processor; 105, a vector register unit; 106, an addition pipe line (ADD-PL); 107, a multiplication pipe line (MPY-PL); 108, a division pipe line (DIV-PL); 110, a load buffer register group; 130, a store buffer register group; 132, a load access pipe line; 134, a load access processor; 201, a priority decision circuit; 202, a store error checking and correction (ECC) circuit; 203, a request buffer group; 204, a memory address register group; 205, an address pipe line; 215, a port group; and 232, a load error checking and correction (ECC) circuit.

Data subjected to vector processing must first be stored in the vector register unit 105 in the following sequence: loading the data from the corresponding main storage unit 3; checking errors at the corresponding ECC circuit 232; aligning the checked data in the load access processor 134; and storing the aligned data as source data in the vector register unit 105 through a corresponding store buffer register in the store buffer register group 130.

The data alignment may be needed for adjusting a difference between a data arrangement in the main storage unit group 3 and a data arrangement for effectively vector-processing the data in the vector register unit 105. More specifically, if the following vector addition is effected:

$$\{c_i\} = \{a_i\} + \{b_i\}$$

where, i=0 to 3
and when vector elements $a_i$ and $b_i$ are stored as follows: $a_0$ and $b_0$ are stored in the MSU 1; $a_1$ and $b_1$ in the MSU 2; $a_2$ and $b_2$ in the MSU 3; and $a_3$ and $b_3$ in the MSU 4. The vector elements $a_0$ to $a_3$ may be sequentially stored in a first vector register of the vector register unit 105 and the vector elements $b_0$ to $b_3$ also may be sequentially stored in a second vector register of the vector register unit 105. To obtain the arrangement as set forth above, the above data alignment is made. A circuit for data alignment will be described in the description of the store access processor 104.

The data alignment may be needed in the data store sequence, if vector elements $c_i$ calculated by the above formula are stored in a third vector register of the vector register unit 105, and $c_0$ is stored in the MSU 1, $c_1$ in the MSU 2, $c_2$ in the MSU 3, and $c_3$ in the MSU 4. The data alignment for storing will be described in detail later.

When a scalar processing unit (SPU) (not shown) detects a vector command, this command is sent to the command controller 101 in the vector processing unit 1. The command controller 101 decodes the vector command from the scalar processing unit (SPU) to determine whether the command is a memory access command or an arithmetic operation command. The command controller 101 also discriminates which pipe line is started. For example, the addition pipe line 106, the multiplying pipe line 107, the division pipe line 108, the store access pipe line 102, or the load access pipe line 132 is started.

If the command controller 101 initializes the store access pipe line 102, a request is sent from the address generator 103 to the priority decision circuit 201 in the memory control unit 2. After a priority is determined at the priority decision circuit 201, store data are read out from the vector register unit 105 and sent to the store access processor 104 through a corresponding load buffer register in the load buffer register group 110, thereby performing store access processing to the corresponding main storage unit 3.

More specifically, the priority decision circuit 201 in the memory control unit 2 sends a request signal to the store access pipe line 102 in the vector processing unit 1, and the priority of each element of the vector data is decided by the priority decision circuit 201. Under these conditions, a data transfer request DTW is sent from the priority decision circuit 201 in the memory control unit 2 to the store access processor 104 in the vector processing unit 1 through the control signal bus 6. Also, identification information (ID) representing part of the address data for discriminating which element is stored in which main storage unit is sent from the priority decision circuit 201 to the store access processor 104 through the address pipe line 205. Upon reception of such information, the store access processor 104 performs processing for reading out store data from the vector register unit 105 and transferring the read data to the store ECC circuit 202 in the memory control unit 2.

The detailed arrangement of the store access processor 104 and relevant circuits thereto will be described with reference to FIG. 2. The vector register unit 105 consists of four vector register groups VR1 to VR4 made up of 256 vector registers. Reference numeral 109, represents a vector register read controller; 110, the load buffer register group including five vector data load registers LDREG0 to LDREG4; 111, an alignment buffer write register group including five alignment buffer write registers ABW0 to ABW4; 112, an alignment buffer unit including four alignment buffers AB1 to AB4; 113, a write address unit; 114, an alignment buffer read register group including four alignment buffer read registers ABR1 to ABR4; 115, a store alignment circuit; 116, an alignment output register group including four alignment output registers AOR1 to AOR4; 117, an alignment controller; 118, a read controller; and 119, a read address unit.

The vector-processed data are read out from the vector registers VR1 to VR4 through the load buffer register group 110 under the condition specified by the vector register read controller 109. The readout data are temporarily stored in the alignment buffer unit 112. The data written in the alignment buffer unit 112 are read out in response to the data DTW and the ID signal from the priority decision circuit 201 in the memory control unit 2. The processed vector elements are aligned by the store alignment circuit 115 to determine which elements have data to send to which corresponding main storage units. The aligned data are sent to the corresponding main storage unit through the corresponding store data bus 5 and the corresponding ECC circuit 202. Therefore, the readout data can be transferred to the corresponding main storage unit 3 through the corresponding ECC circuit 202.

FIG. 3 shows a detailed arrangement of the address generator and the priority decision circuit.

Referring to FIG. 3, reference numeral 103 denotes the address generator; 120, a lead address register group including four lead address registers LA1 to LA4; 121, a distance register group including four distance registers DR1 to DR4; 122, an adder unit including four adders $122_1$ to $122_4$; 123, an address generation controller; 124, an address translation register unit including four address translation registers TR1 to TR4; 125, an address translator group including four translators $125_1$ to $125_4$; 126, a request address register unit including four request address registers RQA1 to RQA4; 201, the priority decision circuit; 203, the request buffer group including four request buffers RQB1 to RQB4; 204, the memory address register group including four memory address registers MAR1 to MAR4; 205, the address pipe line; and 215, the port group including four ports PORT1 to PORT4.

The address generator 103 receives a lead address LEAD-ADR, a distance DISTANCE, a vector length VL, and a start signal START from the command controller 101 and causes the adder unit 122 to generate address data corresponding to each element of vector data. The address data from the address generator 103 is translated by the address translator group 125, thereby supplying request address data to the memory control unit 2.

The lead address LEAD-ADR indicates a first store address of a first vector-processed element, such as $c_0$ in the above example, to be stored in the main storage unit 3. The distance DISTANCE indicates an address distance between adjacent vector-processed elements, such as $c_0$ and $c_1$. The vector length VL is four elements in the above example.

In the memory control unit 2, the request address data is temporarily set in the request buffer group 203 and then input to the priority decision circuit 201 through the port group 215. The priority decision circuit 201 checks a bus conflict (collision) for the memory address register group 204, memory bank busy, and the like. When the priority decision circuit 201 decides a priority, the circuit 201 sends the data transfer request DTW and the ID signal as part of the address information to the store access processor 104 in the vector processing unit 1, thereby requesting data. In response to the data request, the store access pipe line 102, specifically the store access processor 104, reads out the store data from the alignment buffer unit 112 which has stored the data read from the vector register group 105. The readout data are aligned, and the aligned data are transferred to the store ECC circuit 202 in the memory control unit 2.

The start signal START is supplied from the memory control unit 2 to the main storage unit 3 when data are sent out from the memory control unit 2. The request address is temporarily stored in the address pipe line 205, and the request address is sent from the address pipe line 205 to the memory address register group 204 at the time of data transfer from the memory control unit 2 to the main storage unit 3, thereby accessing the main storage unit 3.

The above operations are shown in the timing chart of FIGS. 4a to 4f.

Note that a six machine cycles time, from the priority decision to the activation of the main storage unit 3, is required to store the vector-processed data in the vector register unit 105 in the corresponding main storage units 3.

In the above embodiment, the address pipe line 205 can be omitted.

Referring back to FIG. 1A, the priority decision circuit 201 is operable in response to a command from the scalar processing unit (SPU) or a channel processor (CHP). The command selection is made by a selector 240.

Figure 5A:
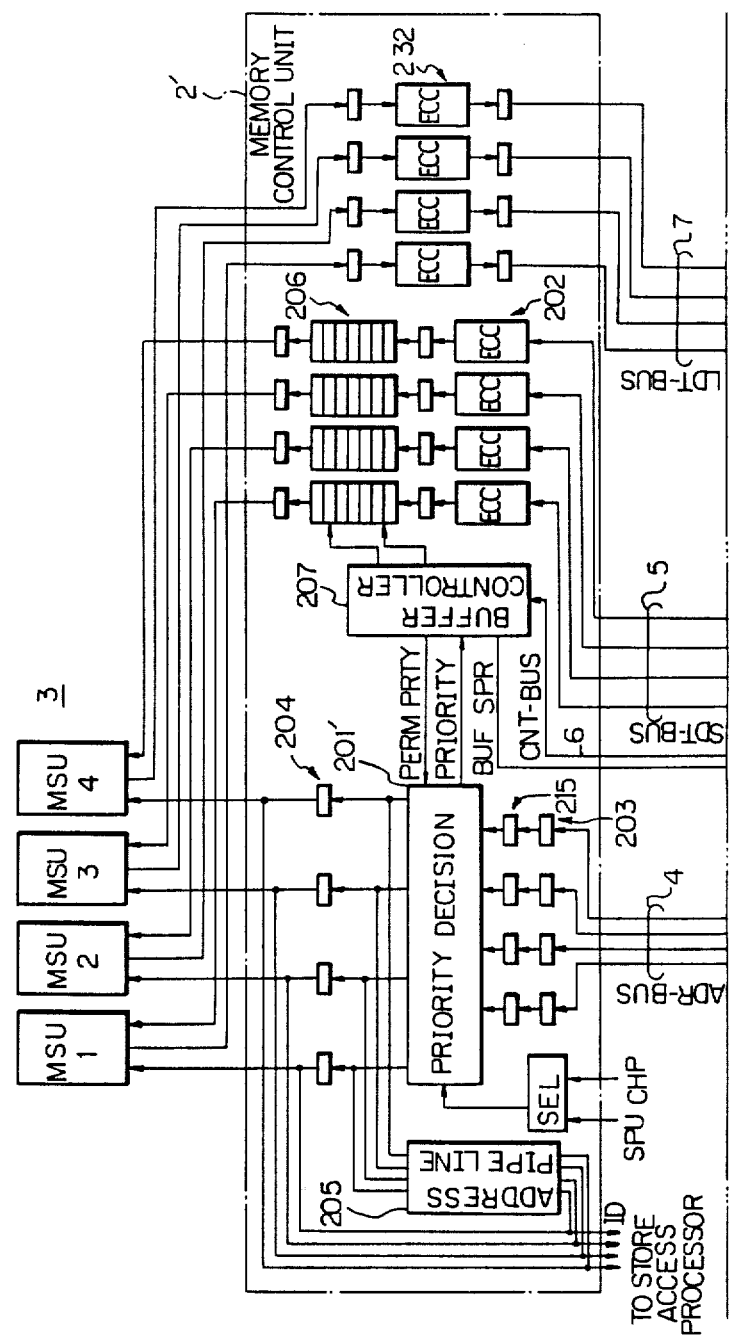
FIG. 5, consisting of FIGS. 5A and 5B are block diagrams showing the configuration of a vector processing system according to another embodiment of the present invention.
Figure 5B:
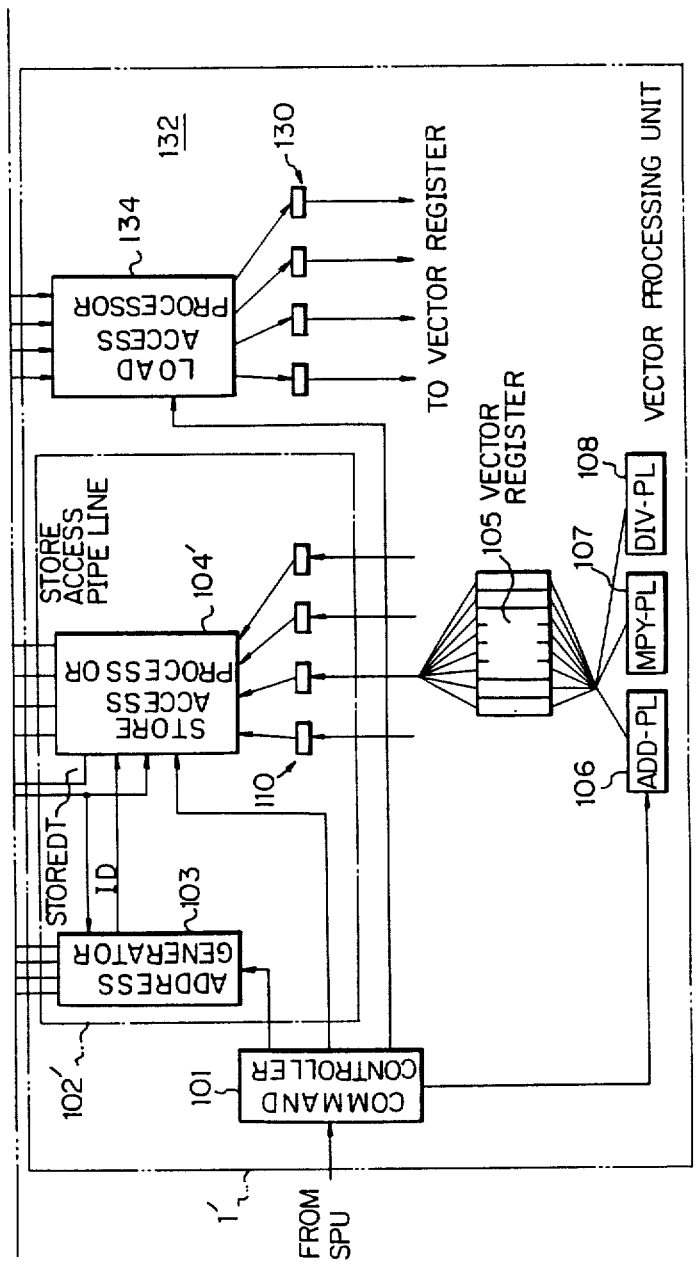

FIGS. 5A and 5B show a vector processing system according to another embodiment of the present invention.

In addition to the circuit elements in the vector processing system in FIGS. 1A and 1B, the vector processing system also includes a store data buffer group 206 and a buffer controller 207.

The operation of the vector processing system shown in FIGS. 5A and 5B will be described below.

When the command controller 101 in the vector processing unit 1' receives a vector store command from a scalar processing unit SPU, a store access pipe line 102' is started. The address generator 103 generates a store address signal in units of vector data elements. A plurality of request address signals are supplied to a priority decision circuit 201' in a memory control unit 2' through four address buses 4. At the same time, part of the address data is sent as ID information to the store access processor 104'. When store access processor 104' recognizes a spare buffer for storing data in a store data buffer group 206, the store access processor 104' reads out data from the vector register unit 105 regardless of the priority decision by the priority decision circuit 201'. The readout data are aligned, and the aligned data are sent to the store ECC circuit 202 in the memory control unit 2'. In this case, the store data send signal STOREDT is simultaneously supplied to the buffer controller 207 in the memory control unit 2'.

When the buffer controller 207 in the memory control unit 2' receives the store data send signal STOREDT from the store access processor 104' in the vector processing unit 1', the buffer controller 207 determines a write address for the store data buffer group 206 and writes the store data in the store data buffer group 206. The store data read out from the vector register unit 105 are supplied to the corresponding store ECC circuit 202, and the corresponding ECC codes are produced. Upon reception of the store data send signal STOREDT from the store access processor 104' in the vector processor unit 1', the buffer controller 207 sends a priority-permission signal PERMPRTY to the priority decision circuit 201'. The priority decision circuit 201' decides the priority of the store for the corresponding vector data element. If such a priority is allowed, the priority decision circuit 201' sends a store request to the main storage unit 3, and simultaneously, a priority signal PRIORITY to the buffer controller 207, so that the store data are read out from the store data buffer 206 and sent to the corresponding main storage units 3.

Figure 7:
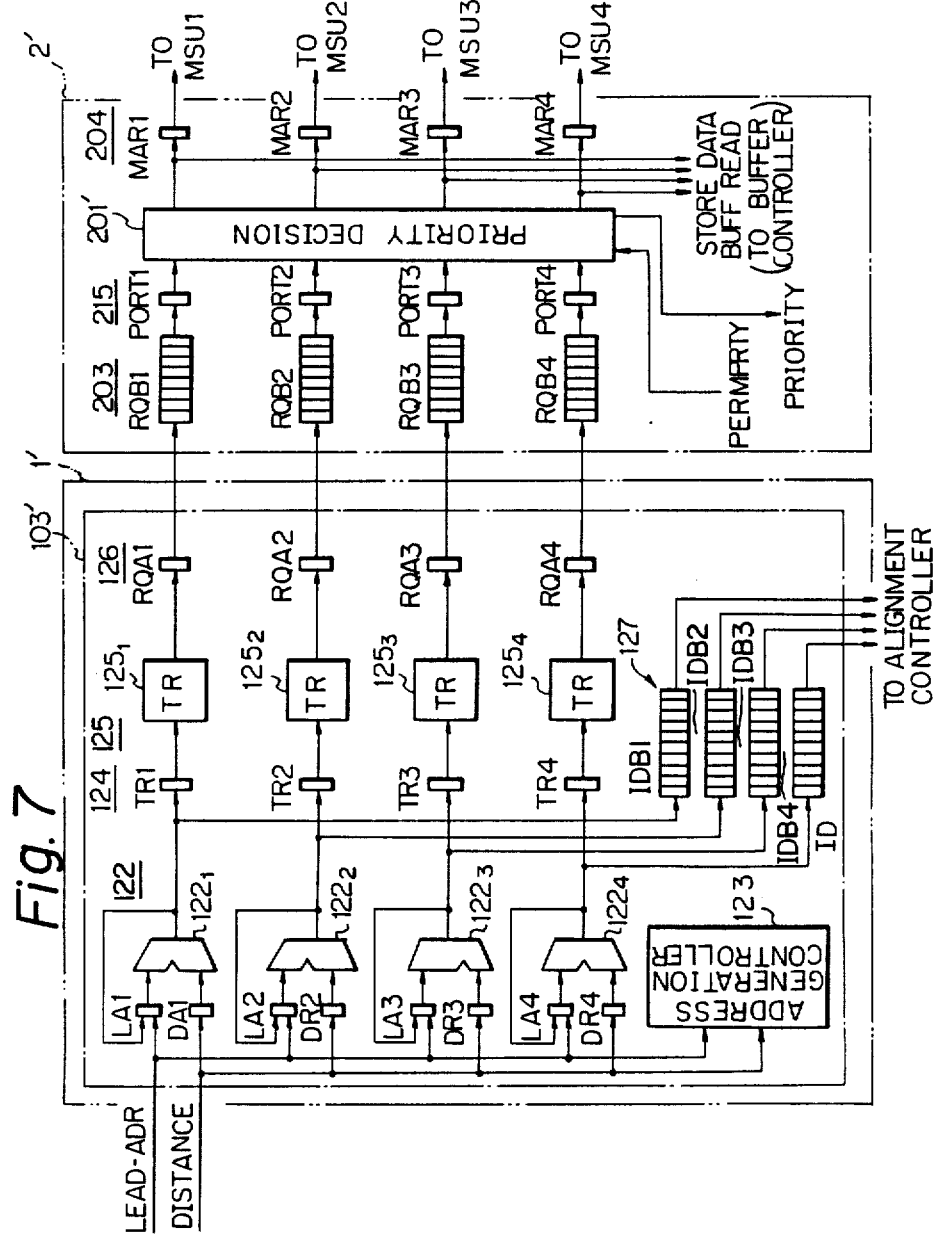
FIG. 7 is a circuit diagram of an address generator in the vector processing unit and a priority decision circuit in FIGS. 5A and 5B.
Figure 8:
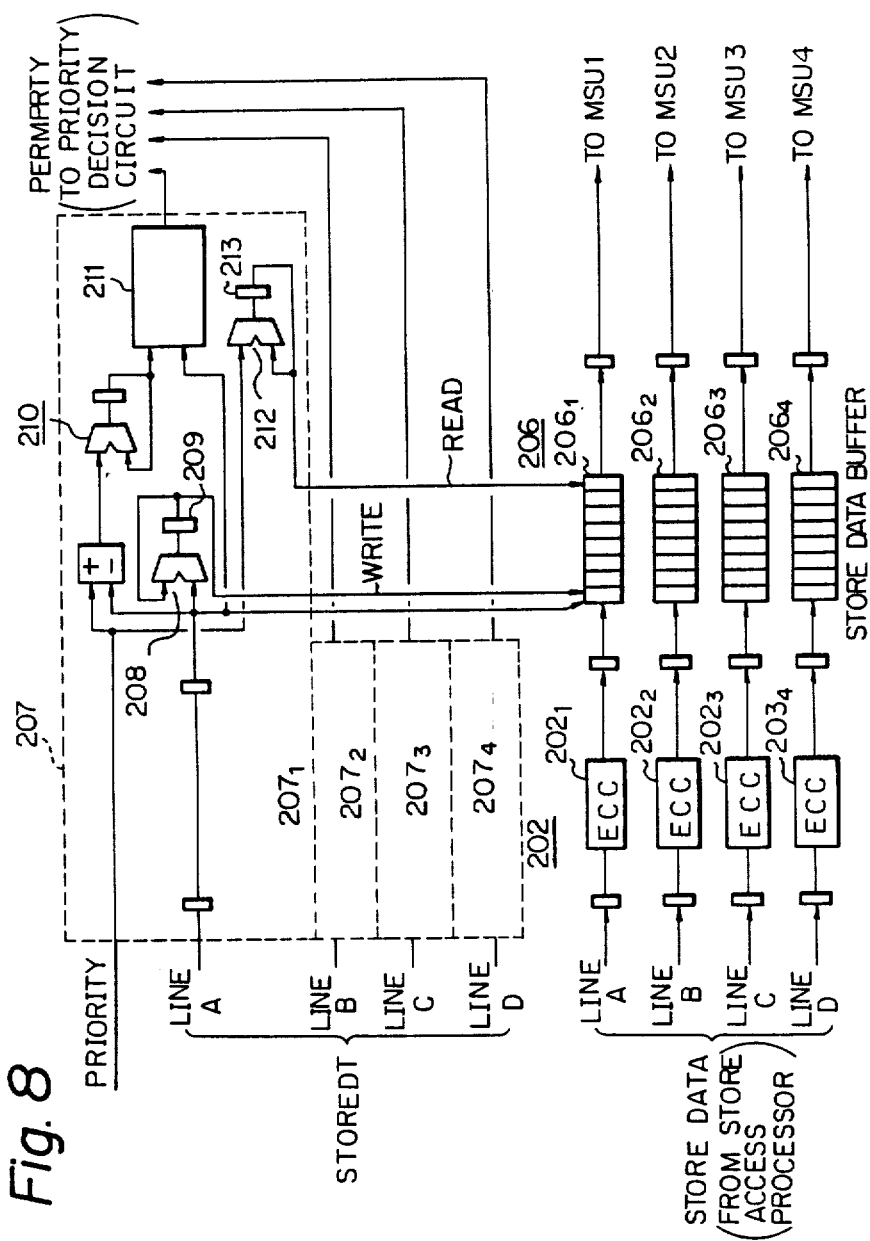
FIG. 8 is a circuit diagram of a buffer controller in a memory control unit in FIG. 5A.

The detailed circuit arrangement of the vector processing system described above is shown in FIGS. 6 to 8. The circuit arrangement in FIGS. 6 to 8 is an improvement on the arrangement of the circuits shown in FIGS. 2 and 3.

Figure 6:
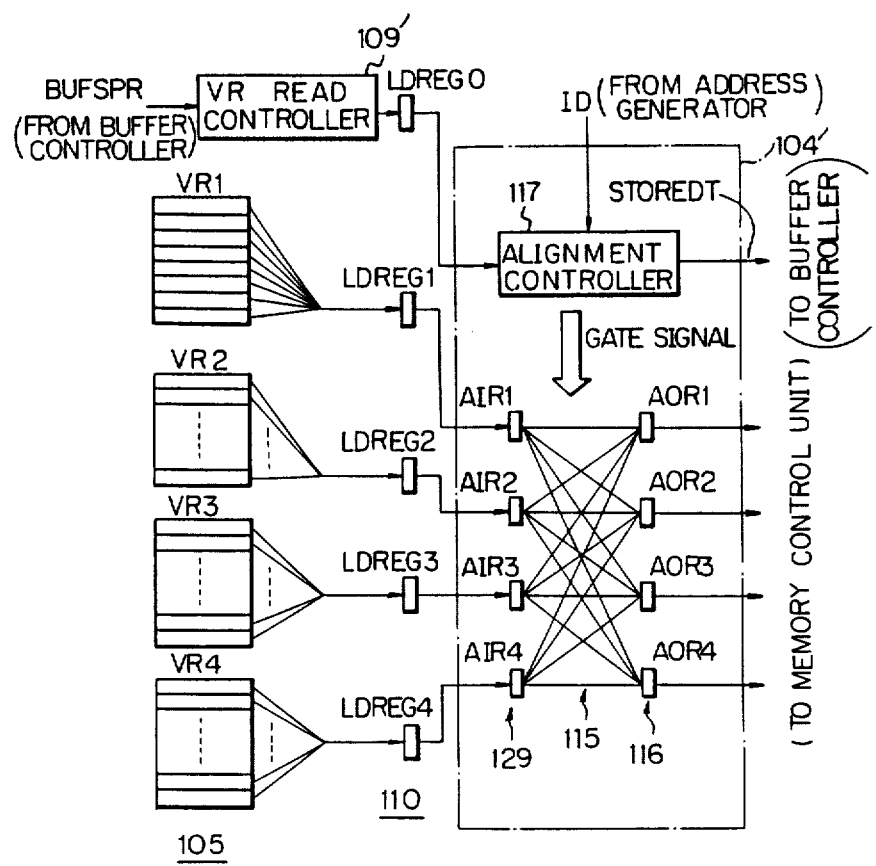
FIG. 6 is a circuit diagram of a store access processor in a vector processing unit in FIG. 5B.

FIG. 6 shows the circuit arrangement of the store access processor 104' and relevant circuits thereto in the vector processing unit 1.

Compared with the circuit shown in FIG. 2, the alignment buffer write register group 111, the alignment buffer unit 112, the write address unit 113, the alignment buffer read register group 114, the read controller 118, and the read address unit 119 in FIG. 2 are omitted from the circuit arrangement in FIG. 6.

Referring to FIG. 6, an alignment input register group (AIR) 129 including four alignment input registers AIR1 to AIR4, is arranged in place of the alignment buffer read register group 114 in FIG. 2. Different than FIG. 2, a vector register read controller 109' executes read operation of store data at the read timing of the vector register read unit when the vector register read controller 109' receives a buffer spare signal BUFSPR from the buffer controller 207 in the memory control unit 2. Other arrangements of the vector register read controller 109' are the same as that in FIG. 2.

As shown in FIG. 7, the address generator 103' includes an identification buffer (IDB) group 127, including identification buffers IDB1 to IDB4 for temporarily storing ID data which includes part of the request address data for the memory control unit 2' and which represents the correspondence between the vector data element and the main storage units 3. The ID data is stored in the ID buffer group 127 at the address generation timing.

As shown in FIG. 6, the alignment controller 117 controls the alignment of the store data read out from the vector register unit 105, on the basis of the ID data from the address generator 103' and sends the ID data to the corresponding store data buses 5. At the same time, the alignment controller 117 sends the store data send signal STOREDT to the buffer controller 207 in the memory control unit 2'.

A detailed arrangement of the address generator 103' is shown in FIG. 7. The address generation controller 103 in FIG. 7 includes the ID buffer 127, as described above. Since the address pipe line in FIG. 3 is optional, it may be arranged in the circuit of FIG. 7. Other arrangements of the circuit in FIG. 7 are the same as those in FIG. 3.

The adder unit 122 adds a distance DISTANCE to a lead address LEAD-ADR of each element of the vector data to produce a store address signal for the corresponding main storage units 3. The address signal is then transferred to the priority decision circuit 201' in the memory control unit 2' through an address translator group 125, the request buffer group 203, and the port group 215. In this case, part of the address data, i.e., the ID data for determining which of the main storage units MSU 1 to MSU 4 is accessed, is stored in the ID buffer 127. The ID data read out from the ID buffer 127 is sent to the alignment controller 117 in FIG. 6, and the store data is used to determine which main storage unit MSU 1 to MSU 4 shall receive the data through the corresponding store data bus 5.

The priority decision circuit 201' in the memory control unit 2' permits the priority, i.e., the main storage unit initialization, when the store data are written in the store data buffer 206 and the priority permission signal PERMPRTY from the buffer controller 207 is present, as shown in FIG. 5A.

The circuit arrangement of the buffer controller 207 in the memory control unit 2' and its associated circuits are shown in FIG. 8. For illustrative convenience, only that portion corresponding to a representative line A is shown.

Referring to FIG. 8, reference numeral 206 denotes the store data buffer; and 207, the buffer controller. For one input line connected to the buffer controller 207, the buffer controller 207 includes a buffer write control circuit 208, a write address register 209, a store data counter 210, a buffer store data count detector 211, a buffer read control circuit 212, and a read address register 213. The arrangement of the buffer controller 207 for the remaining three input lines is the same as that described above.

When store data are transferred from the store access processor 104' in the vector processing unit 1', error correction codes ECC are produced by the corresponding ECC circuit 202 and stored in the corresponding store data buffer 206. Each buffer write control circuit 208 in the buffer controller 207 receives the store data send signal STOREDT upon reception of the corresponding store data from the store access processor 104' in the vector processing unit 1'. Whenever the buffer write control circuit 208 receives the store data send signal STOREDT, it generates a write address signal and a write enable signal for the corresponding store data buffer 206. The write address signal and the write enable signal are stored in the corresponding store data buffer 206. The store data transferred from the store access processor 104' in the vector processing unit 1' is written at the designated address of the corresponding store data buffer 206.

Whenever the store data send signal STOREDT is received by the buffer write control circuit 208, the signal STOREDT is counted by the store data counter 210. The buffer store data count detector 211 checks the count of the store data counter 210. If the count is not zero, the buffer store data count detector 211 sends the priority permission signal PERMPRTY. The priority signal PRORITY obtained upon decision of the priority by the priority decision circuit 201' is supplied to the corresponding buffer read control circuit 212 in the buffer controller 207. The buffer read control circuit 212 reads out the store data from the store data buffer 206. At the same time, the priority signal PRIORITY is also applied to the store data counter 210, and the counter 210 is decremented. The store data counter 210 provides a count obtained by a current difference between the number of data written in the store data buffer 206 and the number of readout data.

The write address register 209 of the buffer write control circuit 208 and the read address register 213 of the buffer read control circuit 212 store the write WRITE and read READ address signals for the corresponding store data buffer 206. The address is updated every time the read and write access cycle is completed.

The above operations are shown in timing charts in FIGS. 9a to 9d.

In the best operation mode, only a two machine cycles time, as shown by solid lines, is required to store the vector-processed data in the vector register unit 105 in the corresponding main storage units 3. Even in the worst operation mode, only a three machine cycles time as shown by dotted lines, is required. Compared with the timing charts shown in FIGS. 4a to 4f, the latter embodiment greatly improves the store access time.

The store data buffer 206 arranged in the memory control unit 2', and the data read out from the vector register unit 105 are subjected to alignment and error checking and correction. The resultant data are stored in the corresponding store data buffer 206 in the memory control unit 2'. Preferably, the number of store data buffers 206 is equal to the number of main storage units in MSU group 3.

As parallel processing, the request from the vector processing unit 1' is sent to the memory control unit 2' and stored in the request buffer group 203 therein.

The priority decision circuit 201' in the memory control unit 2' decides the store priority when data is written in the store data buffer 206 or data to be written is detected. If the request is permitted, the store data can be immediately transferred to the corresponding main storage units 3. In this case, the minimum data transfer time is the bank busy period.

According to this embodiment, the start of the main storage units 3 can be simultaneously performed on a priority basis. Therefore, the bank busy period can be minimized, and processing efficiency can be improved.

In the above embodiment, the circuit elements may be arranged in any unit. For example, the buffer controller 207 may be arranged in the vector processing unit 1'. The store data buffers 206 are preferably located near the main storage units 3.

Many widely different embodiments of the present invention may be constructed without departing from the spirit and scope of the present invention. It should be understood that the present invention is not limited to the specific embodiments described in this specification, except as defined in the appended claims.

I claim:

1. A vector processing system in a computer, operatively connected to at least one main storage means for storing source data to be vector-processed and vector-processed data, said vector processing system comprising:
   (a) first means for storing the vector-processed data;
   (b) second means, operatively connected to said first means, for controlling reading of said vector-processed data from said first means and storing of said vector-processed data in said main storage means;
   (c) at least one third means, operatively connected to said second means and said main storage means with each of said third means corresponding to one of said main storage means, for buffering said vector-processed data received from said first means via said second means;
   (d) fourth means, operatively connected to said second means and said third means, for managing the storing of said vector-processed data from said third means into said main storage means; and
   (e) fifth means, operatively connected to said second means, said fourth means, and said main storage means, for determining priority of store accesses of said main storage means by said vector processing system and another system in the computer, said second means and said main storage means responding to the priority determined in said fifth means by storing said vector-processed data in said main storage means and said main storage means being activated to store said vector-processed data buffered in said third means under one of two conditions—(i) when said vector-processed data is stored in said third means and (ii) when said vector-processed data has begun transferring from said first means to said third means through said second means—is met and the priority of a corresponding store access has been determined by said fifth means.

2. A vector processing system according to claim 1, wherein said second means comprises a first alignment circuit, operatively connected to said first, third, fourth and fifth means, for aligning said vector-processed data, output from said first means in a read order, into aligned data in a store order and for transferring said aligned data to said third means, after completion of vector processing.

3. A vector processing system according to claim 2,
   wherein said fifth means supplies identification information, corresponding to each of the store accesses by said vector processing system, to said second means via said fourth means,
   wherein said second means further comprises and address buffer, operatively connected to said fourth means and said first alignment circuit, for storing the identification information indicating store addresses in said main storage means, and
   wherein a sequence of said vector-processed data is read from said first means and is aligned by said first alignment circuit in response to storage of the identification information in said address buffer.

4. A vector processing system according to claim 3,
   wherein said main storage means comprises a plurality of independently operable main storage units operatively connected to said third and fourth means,
   wherein each of said third means comprises a data buffering circuit operatively connected to a corresponding one of said plurality of main storage units and to said first alignment circuit, and
   wherein said second means controls the storing of said vector-processed data in said main storage units in dependence upon the store order.

5. A vector processing system according to claim 4, wherein said second means comprises a pipeline processor, operatively connected to said first, third, fourth and fifth means, for controlling the reading and storing in parallel.

6. A vector processing system according to claim 5, wherein said first means comprises a first memory circuit, operatively connected to said second means, for storing said vector-processed data.

7. A vector processing system according to claim 6, wherein said first means further comprises a second memory circuit, operatively connected to said main storage units, for storing the source data to be vector-processed.

8. A vector processing system according to claim 7, wherein said first means further comprises a vector calculation circuit, operatively connected to said first and second memory circuits, for performing vector calculations on said source data from said second memory circuit in said first means and for storing said vector-processed data in said first memory circuit in said first means.

9. A vector processing system according to claim 8, further comprising (f) sixth means, operatively connected between said main storage means and said second memory circuit in said first means, for storing said source data from said main storage means into said second memory circuit in said first means.

10. A vector processing system according to claim 9, wherein said sixth means comprises a second alignment circuit, operatively connected to said main storage units and said second memory circuit, for aligning said source data read from said main storage units in the store order into a vector calculation order used in said first means.

11. A vector processing system in a computer, operatively connected to a plurality of main storage units for storing source data to be vector-processed and vector-processed data, said vector processing system comprising:
   a vector processing unit, comprising:

storage means for storing the vector-processed data;

an alignment circuit, operatively connected to said storage means, for aligning the vector-processed data, output from said storage means in a read order, into aligned data in a store order and for outputting the aligned data, after completion of vector processing; and an address buffer, opertively connected to said alignment circuit, for storing identification information indicating store addresses in the main storage units, the store addresses controlling the aligning performed by said alignment circuit; and a memory control unit, comprising:

a plurality of data buffering circuits, operatively connected to said alignment circuit, each of said data buffering circuits operatively connected to a corresponding one of the main storage units, for buffering the vector-processed data received from said storage means via said alignment circuit;

store management means, operatively connected to said alignment circuit, said address buffer and said data buffering circuits, for managing storage of the vector-processed data from said data buffering circuits into the main storage units; and priority determination means, operatively connected to said alignment circuit, said store management means and the main storage units, for determining priority of store accesses of the main storage units by said vector processing system and another system in the computer and for supplying identification information, corresponding to each of the store accesses by said vector processing system, to said address buffer via said storage management means, said alignment circuit and the main storage units responding to the priority determined in said priority determination means by storing the vector-processed data in the main storage units, a sequence of the vector-processed data being read from said storage means and being aligned by said alignment circuit in response to storage of the identification information in said address buffer, and the main storage units being activated to store the vector-processed data buffered in said data buffering circuits when one of two conditions—(i) when the vector processed data is stored in said data buffering circuit and (ii) when the vector-processed data has begun transferring from said storage means to said data buffering circuits via said alignment circuit—is met and the priority of a corresponding store access has been determined by said priority determination means.

* * * * *

UNITED STATES PATENT AND TRADEMARK OFFICE
CERTIFICATE OF CORRECTION

PATENT NO. : 4,827,407

DATED : May 2, 1989

INVENTOR(S) : Shoji Nakatani

It is certified that error appears in the above-identified patent and that said Letters Patent is hereby corrected as shown below:

Col. 7, line 33, "103" should be --123--.
Col. 10, line 8, "and" should be --an--.

Signed and Sealed this

Tenth Day of October, 1989

Attest:

DONALD J. QUIGG

*Attesting Officer*   Commissioner of Patents and Trademarks